(12) United States Patent
Esaki

(10) Patent No.: US 12,288,501 B2
(45) Date of Patent: Apr. 29, 2025

(54) INFORMATION PROCESSING DEVICE, INFORMATION PROCESSING SYSTEM, AND NON-TRANSITORY COMPUTER READABLE MEDIUM FOR DISPLAYING VIRTUAL SCREEN OF AN OBJECT IN VIRTUAL SPACE

(71) Applicant: FUJIFILM Business Innovation Corp., Tokyo (JP)

(72) Inventor: Tatsuyuki Esaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 452 days.

(21) Appl. No.: 17/547,245

(22) Filed: Dec. 10, 2021

(65) Prior Publication Data
US 2023/0035114 A1    Feb. 2, 2023

(30) Foreign Application Priority Data
Jul. 28, 2021 (JP) .................. 2021-123331

(51) Int. Cl.
*G09G 3/20* (2006.01)
*G06V 40/16* (2022.01)

(52) U.S. Cl.
CPC ......... *G09G 3/2092* (2013.01); *G06V 40/161* (2022.01)

(58) Field of Classification Search
None
See application file for complete search history.

(56) References Cited

U.S. PATENT DOCUMENTS

| | | | |
|---|---|---|---|
| 9,213,405 B2 | 12/2015 | Perez et al. | |
| 10,354,621 B1* | 7/2019 | McQueen | G06F 3/0304 |
| 11,238,382 B1* | 2/2022 | Graziano | G06Q 10/063114 |
| 2016/0086382 A1* | 3/2016 | Geisner | G06F 3/04842 345/633 |
| 2016/0109957 A1* | 4/2016 | Takashima | G06F 3/0425 345/8 |
| 2017/0017501 A1* | 1/2017 | Quast | G06F 3/048 |
| 2018/0349699 A1* | 12/2018 | O'Connell | G06V 20/20 |
| 2018/0373936 A1* | 12/2018 | Kim | G06Q 10/101 |
| 2022/0011878 A1* | 1/2022 | Jorasch | A63F 13/215 |
| 2022/0155086 A1* | 5/2022 | Woo | G01C 21/365 |

FOREIGN PATENT DOCUMENTS

| | | |
|---|---|---|
| JP | 2014504413 | 2/2014 |
| JP | 2017027206 | 2/2017 |
| JP | 2019082825 | 5/2019 |

OTHER PUBLICATIONS

"Notice of Reasons for Refusal of Japan Counterpart Application No. 2021-1236331", issued on Mar. 4, 2025, with English translation thereof, p. 1-p. 8.

* cited by examiner

*Primary Examiner* — Edward Martello
(74) *Attorney, Agent, or Firm* — JCIPRNET

(57) ABSTRACT

An information processing device includes a processor configured to: acquire a captured image of a real space; acquire schedule information that is information regarding a schedule of a user; determine, on the basis of the schedule information, from the captured image of the real space, an addition target that is a target to which a virtual screen is to be added; and perform control for displaying the virtual screen in association with the addition target.

20 Claims, 12 Drawing Sheets

| NAME | FACE | ID |
|---|---|---|
| Hanako |  | A1234 |
| ... | ... | ... |

20

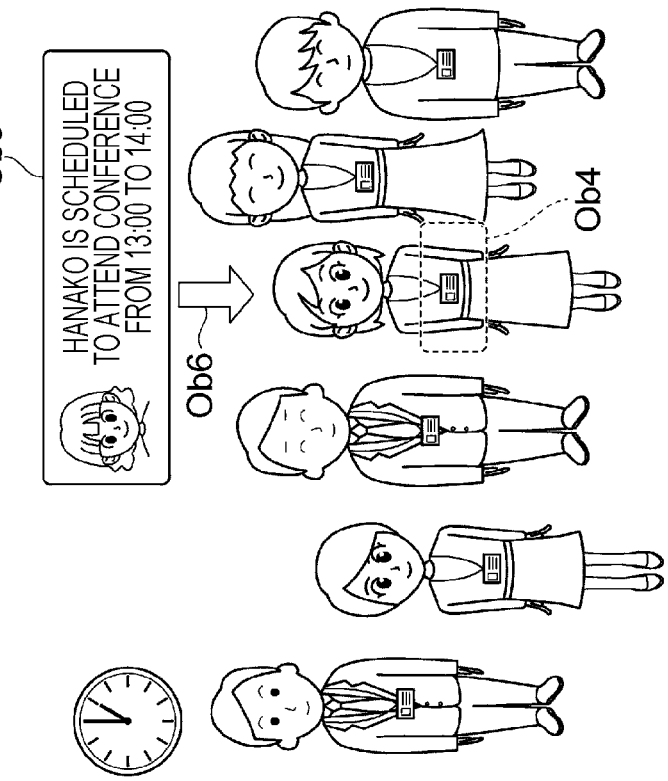
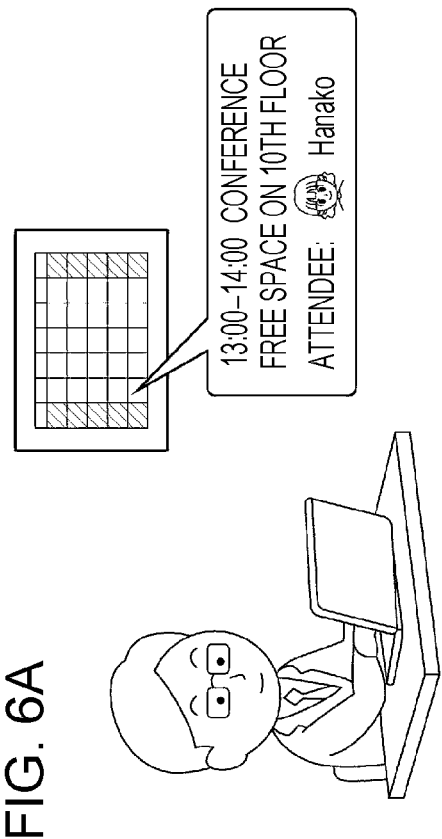
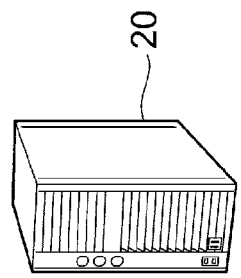

INFORMATION PROCESSING DEVICE, INFORMATION PROCESSING SYSTEM, AND NON-TRANSITORY COMPUTER READABLE MEDIUM FOR DISPLAYING VIRTUAL SCREEN OF AN OBJECT IN VIRTUAL SPACE

CROSS-REFERENCE TO RELATED APPLICATIONS

This application is based on and claims priority under 35 USC 119 from Japanese Patent Application No. 2021-123331 filed Jul. 28, 2021.

BACKGROUND

(i) Technical Field

The present disclosure relates to an information processing device, an information processing system, and a non-transitory computer readable medium.

(ii) Related Art

In the related art, there is an information processing device that displays a virtual screen overlaid on a real space and that enables a user to view the virtual screen on the real space. Specifically, there is known an information processing device that determines an addition target from the real space and that displays the virtual screen in association with the addition target.

Japanese Unexamined Patent Application Publication No. 2017-27206 describes an information processing device that displays, on a display, an overlaid image obtained by overlaying, on an image of a real world captured by an imaging unit, a virtual object located in a virtual three-dimensional space corresponding to the real world. On the basis of a user's line of sight detected by a line-of-sight detecting unit, the information processing device selects the virtual object included in the overlaid image and draws the virtual object in the virtual three-dimensional space toward the user in a manner that the virtual object is displayed in the user's reachable area in the virtual three-dimensional space.

Japanese Unexamined Patent Application Publication No. 2019-82825 describes an information processing device that acquires a captured image of a real space captured by an imaging/displaying device and that controls the imaging/displaying device to display an additional image overlaid on the real space. Specifically, the information processing device extracts information in accordance with a certain condition from a group of pieces of information regarding, for example, a first user who uses an imaging/displaying device, and displays, on an imaging/displaying device used by, for example, a second user, the extracted information overlaid at a position corresponding to the first user in the real space. The group of pieces of information to be displayed in this case is, for example, an attribute or an action of the first user, a post of the first user on a social networking service (SNS), or the like.

SUMMARY

If a virtual screen is displayed in association with all items that may be an addition target when a user uses the above information processing device, not only useful information for the user, but also unnecessary information may be displayed.

Aspects of non-limiting embodiments of the present disclosure relate to an information processing device, an information processing system, and a non-transitory computer readable medium that determine an addition target useful for the user at a certain time point from among the items which may be the addition target and that display the virtual screen.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including a processor configured to: acquire a captured image of a real space; acquire schedule information that is information regarding a schedule of a user; determine, on the basis of the schedule information, from the captured image of the real space, an addition target that is a target to which a virtual screen is to be added; and perform control for displaying the virtual screen in association with the addition target.

BRIEF DESCRIPTION OF THE DRAWINGS

An exemplary embodiment of the present disclosure will be described in detail based on the following figures, wherein:

FIGS. 6A to 6C illustrate a second display example;

DETAILED DESCRIPTION

Configuration of Information Processing System 1

Now, an exemplary embodiment of the present disclosure will be described below in detail with reference to the accompanying drawings.

Figure 1:
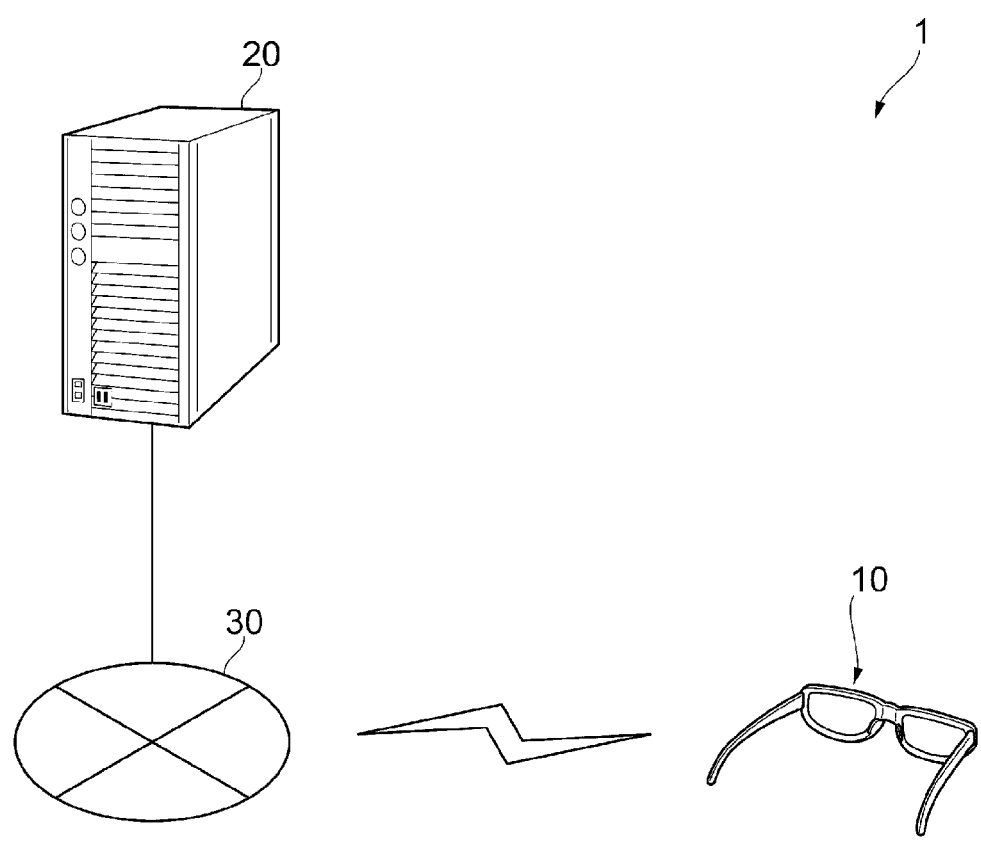
FIG. 1 illustrates an information processing system to which the exemplary embodiment is applied.

FIG. 1 illustrates an information processing system 1 to which the exemplary embodiment is applied.

The information processing system 1 that is illustrated is constituted by connecting an augmented reality (AR) glasses device 10, which is an example of an information processing device, and a management server 20, which is an example of a management apparatus, to each other via a network 30.

Configuration of AR Glasses Device 10

Figure 2:
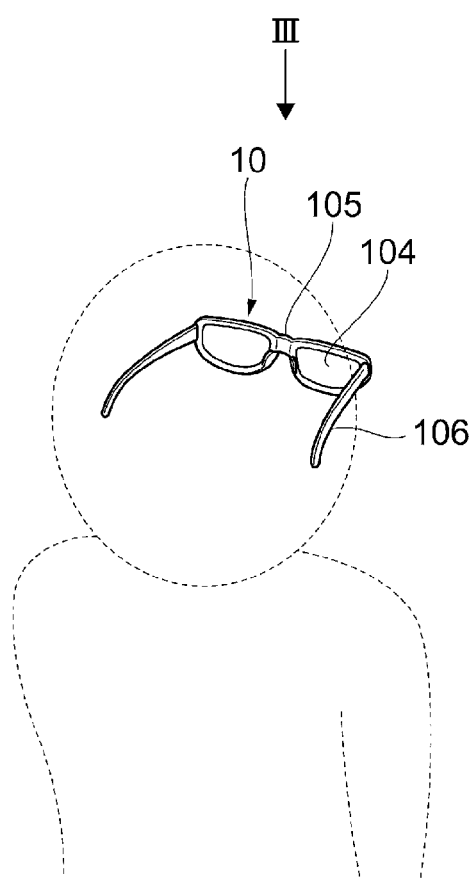
FIG. 2 illustrates the configuration of an augmented reality (AR) glasses device to which the exemplary embodiment is applied.

FIG. 2 illustrates the configuration of the AR glasses device 10 to which the exemplary embodiment is applied.

The AR glasses device 10 is a so-called wearable terminal device in the form of eyeglasses. The term "wearable" herein means to be wearable by a user. Thus, the wearable terminal device in the form of eyeglasses is a computer device in the form of eyeglasses to be actually worn by a user on the head. Having the form of eyeglasses, the AR glasses device 10 includes a lens part 104, a bridge 105, and a temple 106. Note that the "lens part" is the name of a component, the lens part 104, in the wearable terminal device in the form of eyeglasses and also includes components other than lenses. That is, the expression "lens part" is used for convenience because the AR glasses device 10 is in the form of eyeglasses, but actually, the lens part 104 does not necessarily have a function of lenses. That is, the lens part 104 does not necessarily have an optical function of refracting light.

The AR glasses device 10 is a device that displays AR for a user. The "AR" herein means "Augmented Reality" and to display a virtual screen overlaid on a real space for the user. That is, the AR glasses device 10 enables the user to view the virtual screen and also to view the real space through the lens part 104 of the AR glasses device 10. In addition, the "virtual screen" is an image that is created by a computer and that is displayed to be viewed by using a device such as the AR glasses device 10. The "real space" is a space that actually exists.

Display contents of the virtual screen are not limited to any particular ones. Examples include exercise data such as the number of steps, burned calorie, and travel distance; health data such as the user's heart rate and blood pressure; notification data such as a received email and a message; guidance data such as a map and guidance of a surrounding area; and the like. However, although details will be given later, the display contents of the virtual screen relate to the user's schedule information.

Although the AR glasses device 10 is illustrated herein as a so-called device in the form of eyeglasses, the form, method, and the like are not limited to any particular ones as long as the device displays AR for the user. For example, an information terminal device such as a smartphone or a tablet may also be used.

Figure 3:
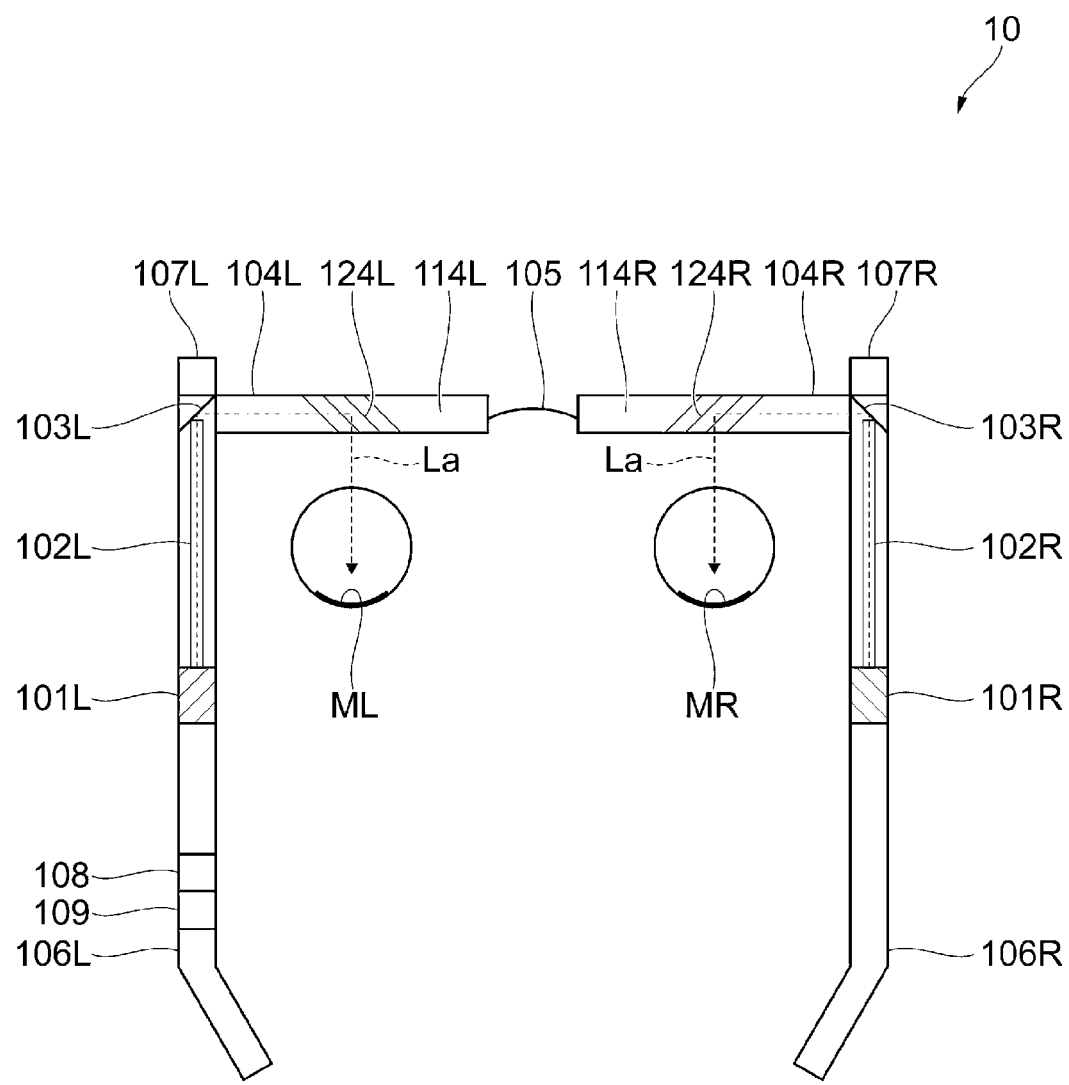
FIG. 3 illustrates an optical system of the AR glasses device.

FIG. 3 illustrates an optical system of the AR glasses device 10.

Note that the AR glasses device 10 illustrated in FIG. 3 is viewed in III direction in FIG. 2. In FIG. 3, "L" is added to reference numerals of members that are on the left of a user who wears the AR glasses device 10 whereas "R" is added to reference numerals of members that are on the right of the user.

The AR glasses device 10 that displays the virtual screen may employ any method from various methods such as a virtual image projection method and a retinal projection method. For example, the AR glasses device 10 has the following configuration. The AR glasses device 10 herein employs the retinal projection method.

The AR glasses device 10 includes laser light sources 101L and 101R, optical fibers 102L and 102R, mirrors 103L and 103R, lens parts 104L and 104R, the bridge 105, temples 106L and 106R, cameras 107L and 107R, a communication module 108, and a control module 109.

The laser light sources 101L and 101R are light sources used for creating a virtual screen. The laser light sources 101L and 101R are capable of creating a full-color virtual screen by using and rapidly switching lasers of three colors, which are red, green, and blue.

The optical fibers 102L and 102R are provided inside the temples 106L and 106R, respectively, and guide laser beams La emitted from the laser light sources 101L and 101R to the mirrors 103L and 103R. The optical fibers 102L and 102R may be made of glass or plastic.

The mirrors 103L and 103R reflect the laser beams La such that traveling directions of the laser beams La are changed to substantially right angles and guide the laser beams La to lens parts 104L and 104R. The mirrors 103L and 103R are capable of swinging vertically and horizontally, thereby changing the angles of the laser beams La incident on the lens parts 104L and 104R. Accordingly, positions of the laser beams La reaching the user's retinas ML and MR change vertically and horizontally. As a result, the user is capable of viewing a two-dimensional image as the virtual screen.

The lens parts 104L and 104R are examples of two lenses and are made of light-transmitting members that are provided in the direction of the user's line of sight when the user wears the AR glasses device 10 on the head. The "light-transmitting members" herein are members that transmit visible light. Note that the light-transmitting members do not necessarily transmit all the visible light. That is, the light-transmitting members may have a function of transmitting part of wavelengths in the visible light region as a so-called filter. The lens parts 104L and 104R include light-guiding parts 114L and 114R, respectively, and reflecting parts 124L and 124R, respectively, therein. The light-guiding parts 114L and 114R totally reflect the laser beams La whose angles have been changed by the mirrors 103L and 103R, respectively, to be guided toward the bridge 105. The reflecting parts 124L and 124R reflect the laser beams La guided by the light-guiding parts 114L and 114R, respectively, at substantially right angles and change the traveling directions of the laser beams La to the directions of the retina ML of the user's left eye and the retina MR of the user's right eye.

In addition, since the lens parts 104L and 104R are light-transmitting members, the user is capable of viewing the real space through the lens parts 104L and 104R. This enables the user to view the virtual screen overlaid on the real space.

The bridge 105 is a member that supports the AR glasses device 10 on the user's nose for the user to wear the AR glasses device 10 on the head.

The temples 106L and 106R are members that support the AR glasses device 10 on the user's ears for the user to wear the AR glasses device 10 on the head.

The cameras 107L and 107R capture images of areas in front of the user. The cameras 107L and 107R are each an example of an image capturer that captures an image of the real space.

The communication module 108 is a communication interface for communicating with an external device.

The control module 109 controls operations of the laser light sources 101L and 101R and the mirrors 103L and 103R when the virtual screen is displayed. The control module 109 can be implemented by operating control software for controlling the laser light sources 101L and 101R and the mirrors 103L and 103R by using a central processing unit (CPU), an internal memory, and an external memory. The CPU herein is an example of a processor.

In the exemplary embodiment, the laser light sources 101L and 101R, the optical fibers 102L and 102R, the mirrors 103L and 103R, and the lens parts 104L and 104R function as a display that displays the virtual screen overlaid on the real space for the user.

Configurations of Management Server 20 and Network 30

The management server 20 manages schedule information that is information regarding the user's schedule. The management server 20 includes a CPU, which is a computing means; a memory, which is a storage means; and a storage such as a hard disk drive (HDD) or a solid state drive (SSD). The CPU herein executes various types of software such as an operating system (OS, basic software) and application software. In addition, the memory is a storage area storing various types of software, data used for execution of the various types of software, and the like, and the storage is a storage area storing input data for the various types of software, output data from the various types of software, and the like.

The management server 20 further includes a communication interface (hereinafter referred to as "communication I/F") for communicating with an external device, a display device including a video memory, a display monitor, or the like, and an input device including a keyboard, a mouse, a touch panel, and the like.

The network 30 is a communication means used for telecommunications between the AR glasses device 10 and the management server 20 and is, for example, the Internet, a local area network (LAN), or a wide area network (WAN). The communication line used for data transmission may be either a wired communication line or a wireless communication line, and both the wired communication line and the wireless wired communication line may be used. In addition, the AR glasses device 10 and the management server 20 may be connected to each other via plural networks or communication lines by using a relay apparatus such as a gateway device or a router.

In the information processing system 1, the AR glasses device 10 acquires information regarding the user's schedule from the management server 20 via the network 30. In addition, the AR glasses device 10 creates display contents of a virtual screen on the basis of the information and displays the virtual screen.

Operations of AR Glasses Device 10

Next, operations of the AR glasses device 10 will be described in detail.

Figure 4:
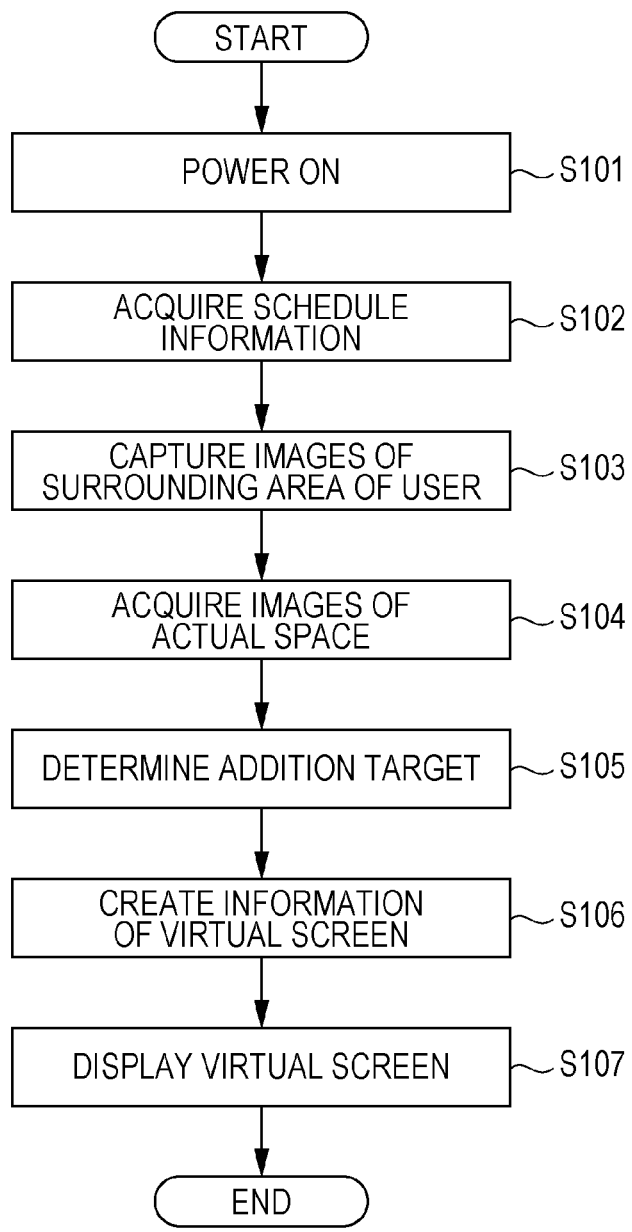
FIG. 4 is a flowchart illustrating operations of the AR glasses device.

FIG. 4 is a flowchart illustrating operations of the AR glasses device 10.

First, the user powers on the AR glasses device 10 (step S101). This starts components of the AR glasses device 10.

Subsequently, the AR glasses device 10 acquires schedule information from the management server 20 (step S102). The "schedule information" is information regarding the user's schedule. The schedule information indicates a schedule of meeting a person or a schedule of using an item. The schedule of meeting a person corresponds to a schedule of a conference, an appointment for a hospital, an appointment for a dinner, or the like. The schedule of using an item corresponds to a reservation for a rental car, a schedule of using a conference room, a reservation for a seat of a vehicle such as a train or an airplane, or the like. More specifically, in a case of the schedule of meeting a person, the schedule information includes the name of the person to meet, the place of a conference etc., and the start time and end time of the conference etc., and the like. In addition, in a case of the schedule of using an item, the schedule information includes the name of an use item to be used, the identification number of the use item, the place where the use item is present, and the start time and end time of using the use item, and the like. Examples of the identification number of an item include the registration number of a car, the number of a conference room, and the seat number of a vehicle, and the like.

In addition, in a case of the schedule of meeting a person, the schedule information may be information indicating an agreement on meeting the person. In this case, the schedule information includes information indicating that the user is to meet the person at a predetermined time.

Furthermore, in a case of the schedule of using an item, the schedule information may be information indicating an agreement with an owner of the use item on using the use item. In this case, the schedule information includes information indicating that the user is to use the use item at a predetermined time.

For example, in a case where an agreement on the scheduled conference is set on groupware or the like, it is considered that the agreement on meeting the person is obtained. In addition, in a case where a reservation is confirmed on an equipment reservation system or the like, it is considered that the agreement on using the use item is already obtained.

The schedule information is acquired by the communication module 108 of the AR glasses device 10 from the management server 20 via the network 30.

Subsequently, the AR glasses device 10 captures images of a surrounding area of the user by using the cameras 107L and 107R (step S103). In other words, the AR glasses device 10 captures images of a real space by using the cameras 107L and 107R.

Furthermore, the control module 109 acquires the captured images of the real space (step S104).

In addition, on the basis of the schedule information, from among the captured images of the real space, the control module 109 determines an addition target (step S105). The "addition target" is a target to which the virtual screen is to be added. That is, the control module 109 performs control for displaying the virtual screen with respect to the addition target that is present in the real space. The addition target is a person determined on the basis of the schedule information and/or a use item to be used by the user. That is, the addition target is the person whom the user is to meet or the item that the user is to use. For example, if the schedule information indicates a schedule of meeting a person, the person is the addition target. In addition, if the schedule information indicates a schedule of using an item, the item is the addition target. In this case, the use item may be a movable property or a real estate.

Subsequently, on the basis of the schedule information, the control module 109 creates information of a virtual screen to be overlaid on the real space and displayed (step S106). Although details will be described later, on the basis of the schedule information, the virtual screen is determined to be useful information for the user from among pieces of displayable information.

Subsequently, the control module 109 performs control for displaying the virtual screen in association with the addition target (step S107). In this case, the virtual screen to be displayed is the information determined in step S106 to be useful for the user. The control module 109 performs control for displaying the virtual screen by controlling the laser light sources 101L and 101R and the mirrors 103L and 103R illustrated in FIG. 3.

Subsequently, the processing from step S101 is repeated at each predetermined time.

DISPLAY EXAMPLES

Next, specific examples of display contents of the virtual screen displayed in step S107 in FIG. 4 will be described.

First Display Example

Figure 5A:
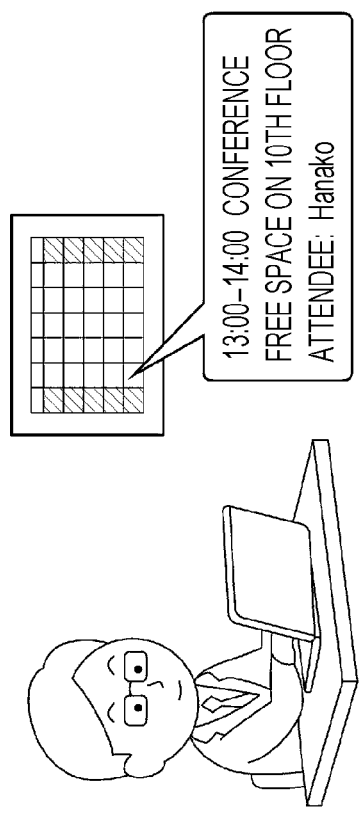
FIGS. 5A to 5C illustrate a first display example.
Figure 5B:
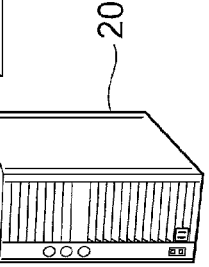
Figure 5C:
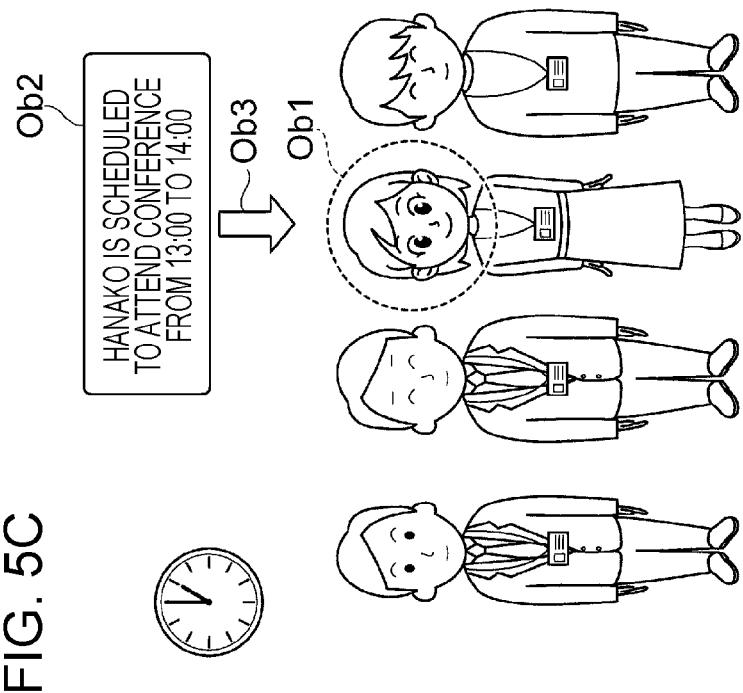

FIGS. 5A to 5C illustrate a first display example.

The first display example illustrates a case where a user is scheduled to meet a person for the first time.

Among FIGS. 5A to 5C, FIG. 5A illustrates schedule information. In this case, the schedule information includes pieces of information such as the start/end time of the schedule, details of the schedule, the place of the schedule, and an attendee. Specifically, the schedule information includes pieces of information such as "13:00 to 14:00" as the start/end time of the schedule, "Conference" as the details of the schedule, "Free Space on 10th Floor" as the place of the schedule, and "Attendee: Hanako" as the attendee. This schedule information is input, for example, by the user of the AR glasses device 10 by using a terminal device such as a personal computer (PC) or a smartphone in advance. The schedule information is stored in the management server 20.

FIG. 5B illustrates pieces of information regarding the schedule information stored in the management server 20. In this case, the management server 20 stores pieces of information such as the name, face, and ID of the attendee "Hanako" included in the schedule information. These pieces of information are input, for example, by a person who has met the attendee "Hanako" before and are stored in the management server 20.

The information illustrated in FIGS. 5A and 5B is transmitted to the AR glasses device 10, as described in step S102 in FIG. 4.

FIG. 5C illustrates a real space and virtual screens that the user actually views through the AR glasses device 10.

As illustrated, an object Ob1 that is a dotted circle is displayed as a virtual screen on the face part of the attendee "Hanako". In addition, part of the schedule information is displayed as an object Ob2, and an object Ob3 that is an arrow associating the object Ob1 and the object Ob2 with each other is displayed.

In this case, the addition target is the attendee "Hanako". The position of the addition target is determined to be a position in the real space on the basis of the schedule information. The position of the addition target is determined on the basis of a feature point of the addition target included in a captured image of the real space. In this case, the feature point is the face of the person whom the user is to meet. In this case, the position of "Hanako" is determined on the basis of the information on the face of the attendee "Hanako" stored in the management server 20.

In addition, the virtual screens are added to be adjacent to the position determined to be the position of the addition target. In this case, the objects Ob1 to Ob3 are displayed to be adjacent to the attendee "Hanako".

In the case of FIGS. 5A to 5C, the position of the attendee "Hanako", which is the addition target, is determined by using face recognition, and the objects Ob1 to Ob3, which are the virtual screens, are added to be adjacent to the attendee "Hanako".

Second Display Example

FIGS. 6A to 6C illustrate a second display example.

As in the first display example, the second display example illustrates a case where a user is scheduled to meet a person for the first time.

Among FIGS. 6A to 6C, FIG. 6A illustrates schedule information. In this case, the schedule information includes face information of the attendee "Hanako", as compared with the case illustrated in FIG. 5A.

FIG. 6B illustrates pieces of information regarding the schedule information stored in the management server 20. As in the case in FIG. 5B, details of the information are the name, face, and ID of the attendee "Hanako".

FIG. 6C illustrates a real space and virtual screens that the user actually views through the AR glasses device 10.

As illustrated, an object Ob4 that is a dotted rectangle is displayed as a virtual screen on the ID card of the attendee "Hanako". In addition, part of the schedule information is displayed as an object Ob5, and an object Ob6 that is an arrow associating the object Ob4 and the object Ob5 with each other is displayed.

Also in this case, the addition target is the attendee "Hanako". On the other hand, the position of the addition target is determined by a position determiner. The "position determiner" is a device or an item for grasping the position of the addition target. In this case, the position determiner is the ID card owned by the attendee "Hanako". In this case, the position of the ID card is grasped, for example, by a beacon or the like. In addition, the position of the ID card is acquired by the AR glasses device 10, and the position of the attendee "Hanako", which is the addition target, is determined. Furthermore, the virtual screens are added to be adjacent to the position determined to be the position of the addition target. In this case, the objects Ob4 to Ob6 are displayed to be adjacent to the attendee "Hanako".

In this case, the face of the attendee "Hanako" stored in the management server 20 is the way she looked in the past and differs from the way she looks currently. In this case, "Hanako" is not determined by face recognition but may be determined by using the ID card, which is the position determiner. Note that, when details indicated on the ID card are recognizable, the attendee "Hanako" may be determined by the ID or the like indicated on the ID card. In addition, a new face image may be fed back from the AR glasses device 10 to the management server 20 to update the piece of information regarding the schedule information in the management server 20 to the new face image.

Third Display Example

Figure 7:
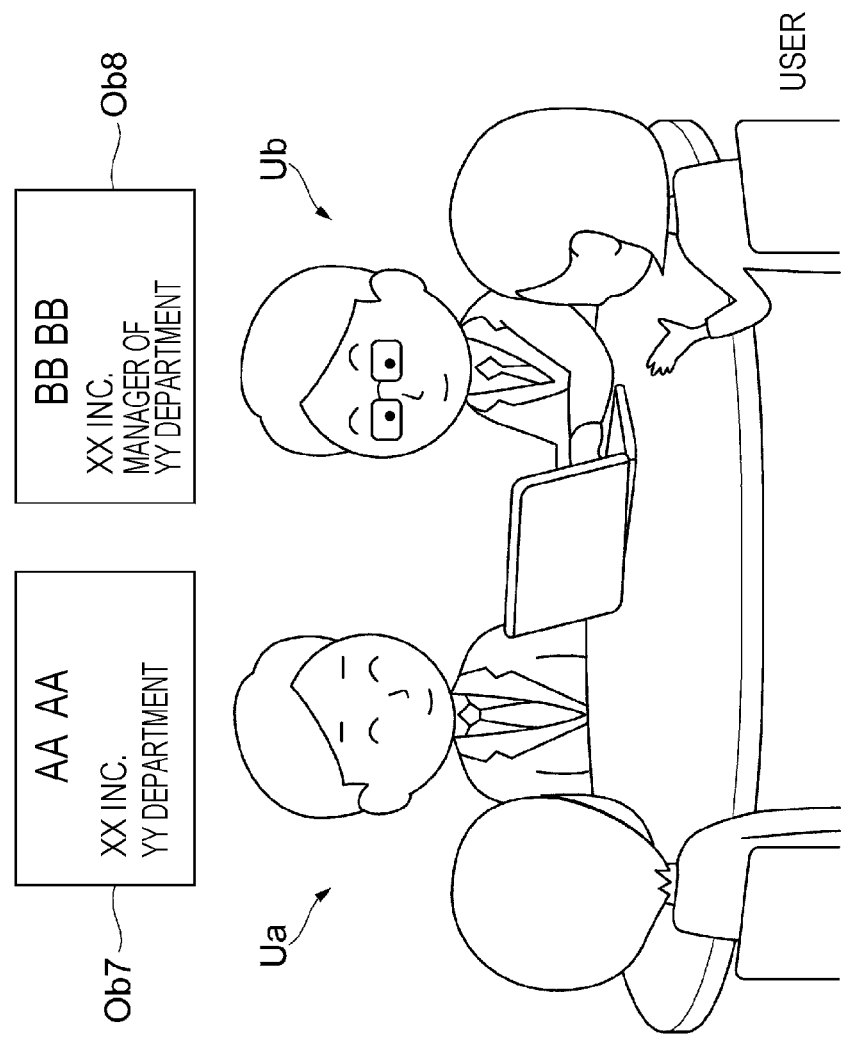
FIG. 7 illustrates a third display example.

FIG. 7 illustrates a third display example.

The third display example illustrates a case in which a user is scheduled to hold a conference and virtual screens are displayed during the conference.

In this example, an object Ob7 is displayed as a virtual screen adjacent to an attendee Ua from the other party at the conference. The object Ob7 is an image of a business card of the attendee Ua. In addition, an object Ob8 is displayed as a virtual screen adjacent to an attendee Ub from the other party at the conference. The object Ob8 is an image of a business card of the attendee Ub. In this case, addition targets are the attendees Ua and Ub. Not only the images of the business cards, but also the names, phonetic guides thereof, departments, posts, face images, or the like of the attendees Ua and Ub from the other party may be displayed.

These images of the business cards are stored, for example, in the management server 20 and are acquired by the AR glasses device 10 from the management server 20 on the basis of the schedule information.

Fourth Display Example

Figure 8:
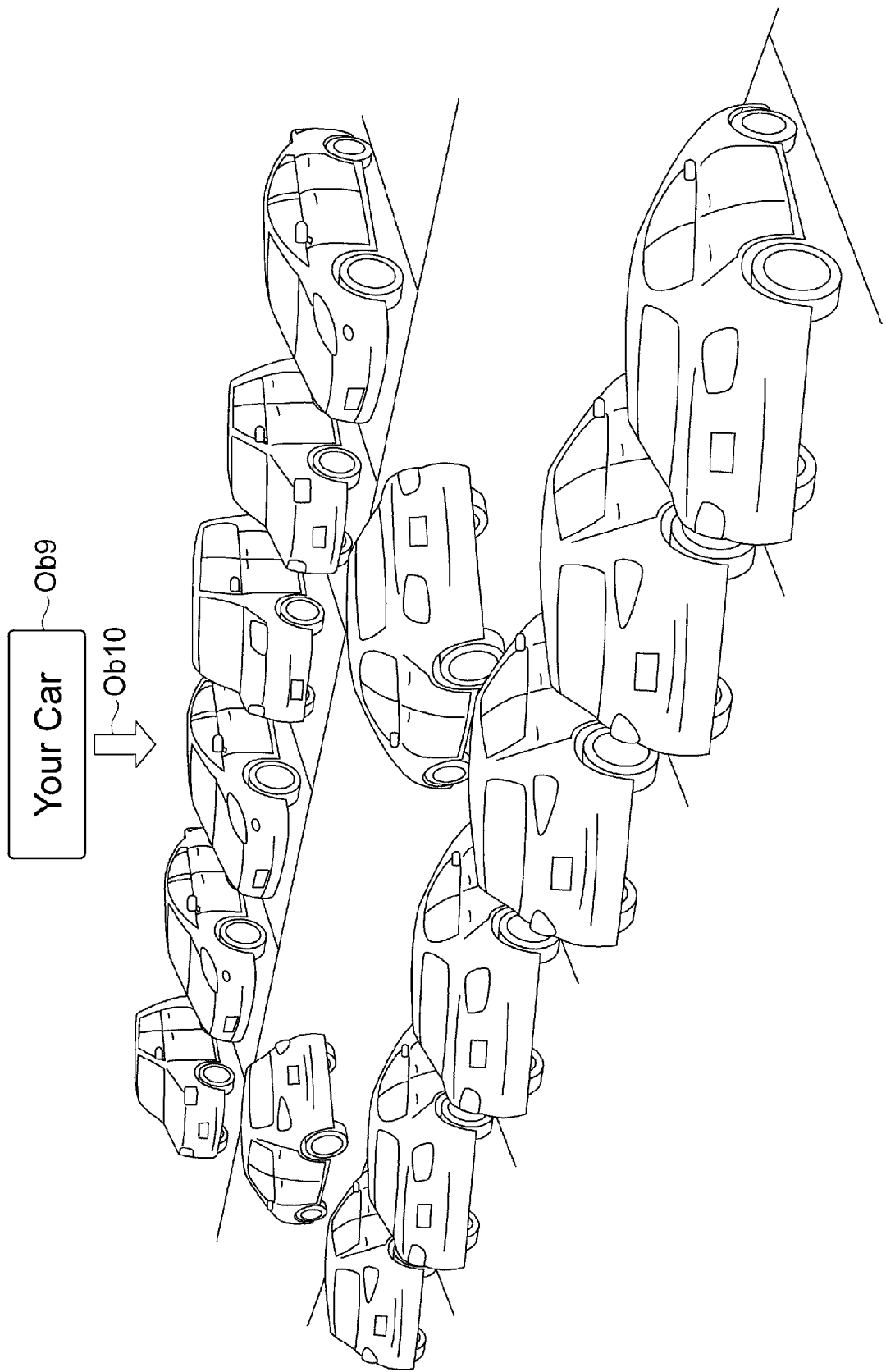
FIG. 8 illustrates a fourth display example.

FIG. 8 illustrates a fourth display example.

The fourth display example illustrates a case in which a user is scheduled to use a car and virtual screens are displayed with respect to the car that the user is to use. For example, the user is capable of reserving and using this car by receiving a service such as carsharing or a rental car.

In this case, the schedule information includes pieces of information such as the start time/end time of using the car, the type of the car to be used, the registration number thereof, the color thereof, the size thereof, an external appearance image thereof, the position where the car is present, or the like. In addition, a use item to be used by the user and an addition target to which a virtual screen is to be added correspond to this car. On the basis of the schedule information, the AR glasses device 10 creates and displays the virtual screens.

In this case, the position where the car that the user is to use is present is indicated by objects Ob9 and Ob10. As the object Ob9, "Your Car" indicating the car reserved by the user is displayed. As the object Ob10, an arrow associating the car and the object Ob9 with each other is displayed. The position of the car may be grasped, for example, by parking the car that is the use item at a predetermined parking position. The position of the car may also be grasped by a car-mounted global positioning system (GPS) unit. The GPS unit may be considered as an example of the position determiner.

Fifth Display Example

Figure 9:
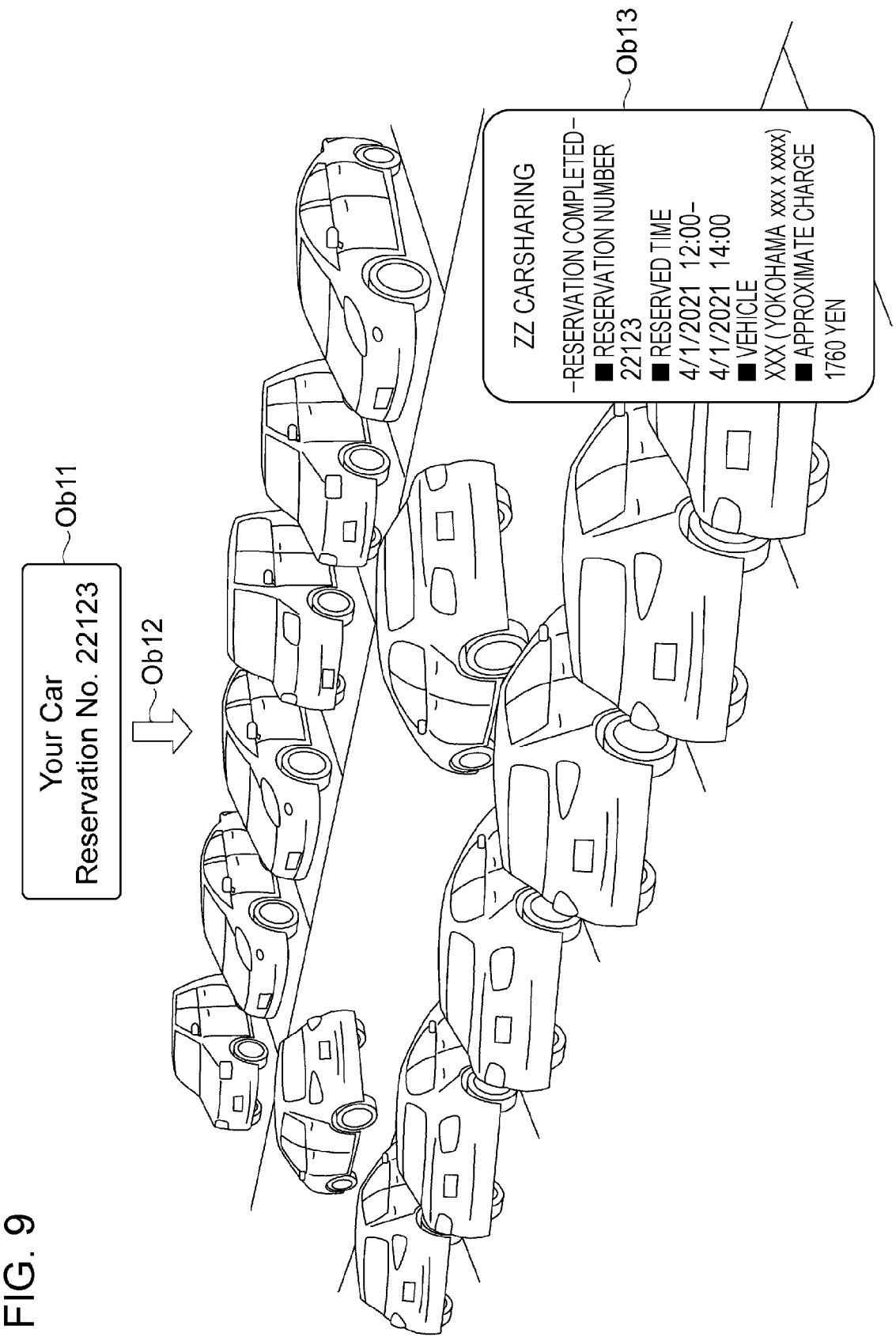
FIG. 9 illustrates a fifth display example.

FIG. 9 illustrates a fifth display example.

The fifth display example illustrates a case in which, as in the fourth display example, a user is scheduled to use a car and virtual screens are displayed with respect to the car that the user is to use. In addition, this example illustrates a case in which the displayed virtual screens are different from those in the case in FIG. 8.

In this case, the position where car that the user is to use is present is indicated by objects Ob11 and Ob12. As the object Ob11, "Your Car Reservation No. 22123" indicating the car reserved by the user and a reservation number is displayed. As the object Ob12, an arrow associating the car and the object Ob11 with each other is displayed. In addition, in this example, details of the car reservation are displayed as an object Ob13. In this example, as captions, in addition to "ZZ Carsharing", the reservation number, the reserved time, the vehicle, and an approximate charge are displayed.

Sixth Display Example

Figure 10:
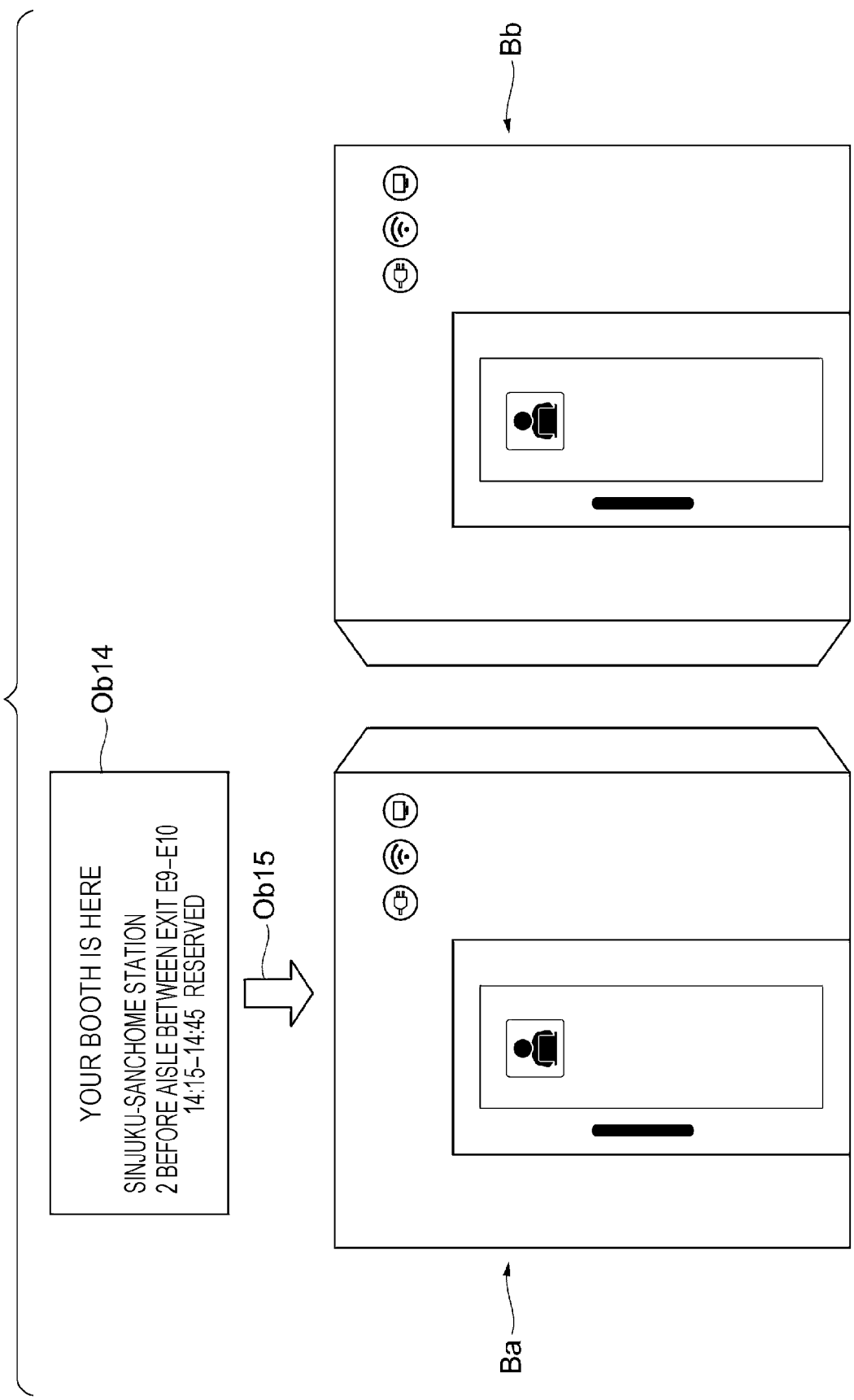
FIG. 10 illustrates a sixth display example.

FIG. 10 illustrates a sixth display example.

The sixth display example illustrates a case in which a user is scheduled to use a booth and virtual screens are displayed with respect to the booth that the user is to use. For example, the user is capable of reserving and using this booth by receiving a service such as office sharing.

In this case, the schedule information includes pieces of information such as the start time/end time of using the booth, the position where the booth is present, the booth number, or the like. In addition, a use item to be used by the user and an addition target to which a virtual screen is to be added correspond to this booth.

In this case, of booths Ba and Bb, the position where the booth Ba that the user is to use is present is indicated by objects Ob14 and Ob15. As the object Ob14, "Your Booth Is Here" indicating the booth reserved by the user, the position where the booth is present, and the start time/end time of using the booth are displayed. As the object Ob15, an arrow associating the booth Ba and the object Ob14 with each other is displayed.

Other Display Examples

A virtual screen may include details included in the schedule information. That is, the details included in the schedule information may be details for use in determining a person on the basis of the schedule information. The details included in the schedule information may also be details for use in determining a use item to be used by the user.

In addition, the virtual screen may be changed after an elapse of a predetermined period on the basis of the schedule information. Thus, information that is useful at a certain time point is displayed as the virtual screen. For example, before the start time of a conference, information for determining a person whom the user is to meet for the first time may be displayed as in the first and second display examples. After the start time of the conference, a change may be made such that information such as the name and post of the person is displayed as in the third display example. Furthermore, the timing of the change may be when an addition target is kept being recognized for a predetermined period. That is, when the addition target is kept being recognized for the predetermined period, it is considered that the user has already grasped the person whom the user is to meet or a use item that the user is to use, and thus, switching to another information is performed.

Control of Period for Displaying Virtual Screen

Next, a case of controlling a period for displaying a virtual screen will be described. That is, the virtual screen is displayed within a predetermined period and is not displayed out of the period.

Figure 11:
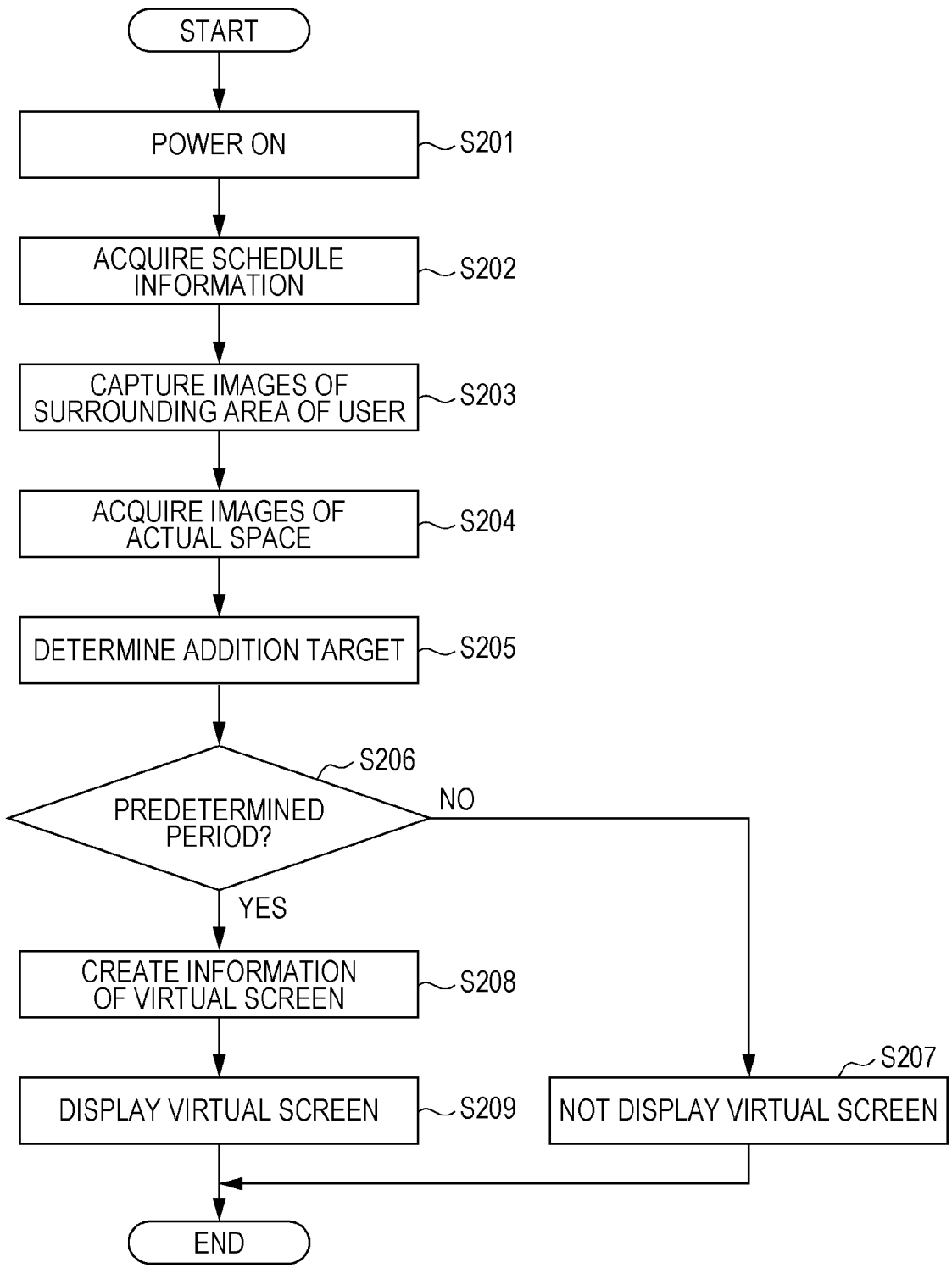
FIG. 11 is a flowchart illustrating operations of the AR glasses device when a period for displaying a virtual screen is controlled.

FIG. 11 is a flowchart illustrating operations of the AR glasses device 10 when the period for displaying a virtual screen is controlled.

Steps S201 to S205 and steps S208 and S209 in the flowchart illustrated in FIG. 11 are substantially the same as steps S101 to S105 and steps S106 and S107 in the flowchart illustrated in FIG. 4, respectively. The flowchart illustrated in FIG. 11 is different from the flowchart illustrated in FIG. 4 in that steps S206 and S207 are added. Therefore, processing in steps S206 and S207 will be described below.

In step S206, the control module 109 determines whether the current time falls within a predetermined period for displaying a virtual screen (step S206).

If the current time does not fall within the predetermined period (No in step S206), the control module 109 does not create or display the virtual screen (step S207).

On the other hand, if the current time falls within the predetermined period (Yes in step S206), the control module 109 creates information of the virtual screen to be displayed by being overlaid on the real space on the basis of the schedule information (step S208) and performs control for displaying the virtual screen (step S209).

Now, the predetermined period in step S206 will specifically be described.

FIGS. 12A to 12D illustrate settings of the predetermined period for displaying a virtual screen.

The illustrated periods include the start time and/or the end time of a schedule.

Among FIGS. 12A to 12D, FIG. 12A corresponds to a case in which a virtual screen is displayed for a period from the start time to the end time of a user's schedule. That is, at the start time of the schedule, the virtual screen is started to be displayed. At the end time of the schedule, the virtual screen that has been displayed is hidden. This is a case in which the virtual screen is controlled to be displayed or hidden in accordance with the times of the user's schedule.

Figure 12A:
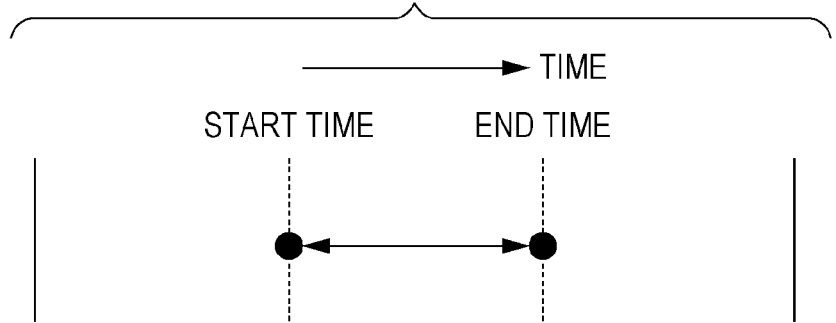
FIGS. 12A to 12D illustrate settings of a predetermined period for displaying a virtual screen.
Figure 12B:
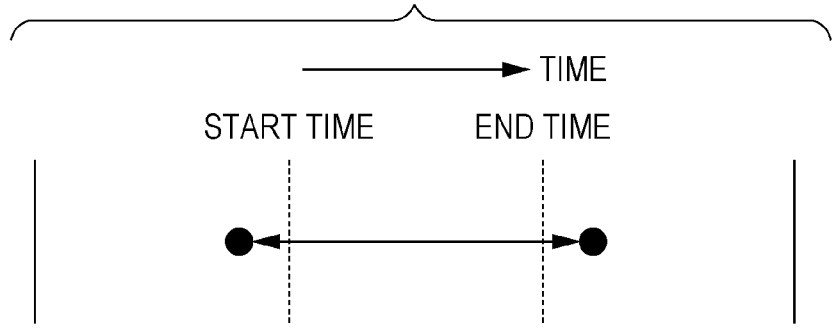

In addition, FIG. 12B corresponds to a case in which a virtual screen is displayed for a period from a certain time before the start time of a user's schedule to a certain time after the end time of the user's schedule, including the start time and the end time. That is, at a time shortly before the start time of the schedule, the virtual screen is started to be displayed. At a time shortly after the end time of the schedule, the virtual screen that has been displayed is hidden. Thus, useful information is presented to the user for a certain period even before the start time and after the end time.

Figure 12C:
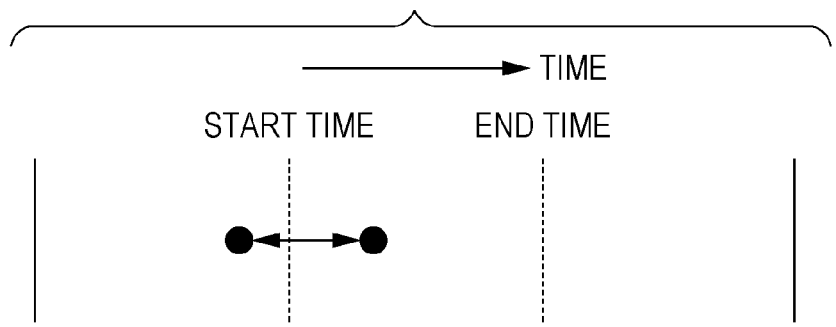

On the other hand, in FIG. 12C, a virtual screen is started to be displayed at a certain time before the start time of a user's schedule. When a predetermined period elapses from the start time of the schedule, the virtual screen that has been displayed is hidden. That is, for example, in a case where the user is scheduled to meet a person for the first time as in the cases in the first and second display examples illustrated in FIGS. 5A to 5C and FIGS. 6A to 6C, it is more convenient for the user to display the screens in FIGS. 5A to 5C and FIGS. 6A to 6C from before the start time of the schedule. In addition, after the start time of the schedule, it is expected that the user is already meeting the person, and thus, the virtual screens illustrated in the first and second display examples may be hidden.

In addition, in FIG. 12C, when the addition target is kept being recognized for the predetermined period, the virtual screen that has been displayed may be hidden. That is, for example, in a case where the user is scheduled to meet a person for the first time as in the cases in the first and second display examples illustrated in FIGS. 5A to 5C and FIGS. 6A to 6C, when this person, who is the addition target, is kept being recognized for the predetermined period, it is expected that the user is already meeting the person, and thus, the virtual screens illustrated in the first and second display examples may be hidden.

Furthermore, in FIG. 12C, when the addition target comes to be within a predetermined distance, the virtual screen that has been displayed may be hidden. That is, for example, in a case where the user is scheduled to meet a person for the first time as in the cases in the first and second display examples illustrated in FIGS. 5A to 5C and FIGS. 6A to 6C, when this person, who is the addition target, comes to be within a predetermined distance, it is expected that the user already recognizes and is meeting the person, and thus, the virtual screens illustrated in the first and second display examples may be hidden.

Figure 12D:
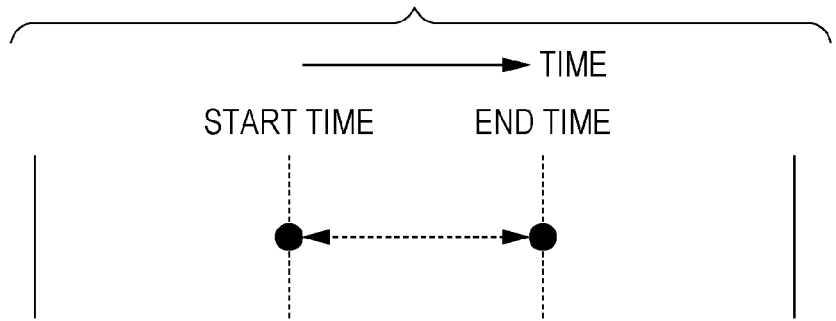

In addition, a virtual screen may be intentionally hidden when the virtual screen is supposed to be displayed. FIG. 12D illustrates this by using the dotted line. For example, the virtual screen that has been displayed is hidden when the user is regarded as remembering the addition target. For example, if the user has already met the person a predetermined number of times or more, it is considered that the user remembers the person's face or the like. In this case, the virtual screen is hidden even when the virtual screen is supposed to be displayed. This can prevent unnecessary information from being displayed as the virtual screen.

Furthermore, a virtual screen may be kept being displayed without being hidden when the addition target includes plural addition targets. For example, in a case where, as the plural addition targets, there are plural attendees from the other party at the conference as in the third display example illustrated in FIG. 7, the virtual screen is not hidden. This can prevent the user from confusing the plural addition targets.

Note that display information of a virtual screen is created by the AR glasses device 10 on the basis of the schedule information in the above examples, but may also be created by the management server 20 and be transmitted to the AR glasses device 10 and displayed.

Description of Program

The process executed by the AR glasses device 10 in the exemplary embodiment described above is performed, for example, in accordance with a program such as control software.

Accordingly, the program for implementing the process executed by the AR glasses device 10 in the exemplary embodiment can be regarded as a program causing a computer to implement a function of acquiring a captured image of a real space, a function of acquiring schedule information that is information regarding a schedule of a user, a function of determining, on the basis of the schedule information, from the captured image of the real space, an addition target that is a target to which a virtual screen is to be added, and a function of performing control for displaying the virtual screen in association with the addition target.

Note that the program for implementing the exemplary embodiment may be provided not only by a communication means but also by being stored in a recording medium such as a compact disc read only memory (CD-ROM).

Although the exemplary embodiment has been described above, the technical scope of the present disclosure is not limited to the scope described in the above exemplary embodiment. It is obvious from the scope of the claims that various modifications and alternations added to the above exemplary embodiment are also included in the technical scope of the present disclosure.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

What is claimed is:

1. An information processing device comprising:
 a processor configured to:
  acquire a captured image of a real space;
  acquire schedule information that is information regarding a schedule of a user;

determine, on the basis of the schedule information, from the captured image of the real space, an addition target that is a target to which a virtual screen is to be added, wherein
the schedule information comprises identification information for identifying the addition target among candidate addition targets, and
determine, on the basis of the schedule information, from the captured image of the real space, the addition target comprising:
perform an image recognition of the captured image of the real space so as to identify the addition target based on the identification information; and
perform control for displaying the virtual screen in association with the addition target, wherein the virtual screen displays information for identifying the addition target among candidate addition targets.

2. The information processing device according to claim 1, wherein the addition target is a person determined on the basis of the schedule information and a use item to be used by the user.

3. The information processing device according to claim 2, wherein the schedule information is information indicating an agreement on meeting the person when the addition target is the person and is information indicating an agreement with an owner of the use item on using the use item when the addition target is the use item.

4. The information processing device according to claim 2, wherein the schedule information includes information indicating that the user is to meet the person at a predetermined time when the addition target is the person and includes information indicating that the user is to use the use item at a predetermined time when the addition target is the use item.

5. The information processing device according to claim 1, wherein a position of the addition target is determined to be a position in the real space, and the virtual screen is added to be adjacent to the determined position.

6. The information processing device according to claim 5, wherein the position of the addition target is determined on the basis of a feature point of the addition target included in the captured image of the real space.

7. The information processing device according to claim 6, wherein the feature point is a face of the person whom the user is to meet.

8. The information processing device according to claim 5, wherein the position of the addition target is determined by a position determiner.

9. The information processing device according to claim 1, wherein the virtual screen is displayed within a predetermined period and is not displayed out of the period.

10. The information processing device according to claim 9, wherein the predetermined period includes a start time and/or an end time of the schedule.

11. The information processing device according to claim 9, wherein the virtual screen that has been displayed is hidden when the predetermined period elapses from a start time of the schedule.

12. The information processing device according to claim 9, wherein the virtual screen that has been displayed is hidden when the addition target is kept being recognized for the predetermined period.

13. The information processing device according to claim 9, wherein the virtual screen is kept being displayed without being hidden when the addition target includes a plurality of addition targets.

14. The information processing device according to claim 1, wherein the virtual screen that has been displayed is hidden when the addition target comes to be within a predetermined distance between the addition target and the information processing device.

15. The information processing device according to claim 1, wherein the virtual screen that has been displayed is hidden when the user is regarded as remembering the addition target.

16. The information processing device according to claim 1, wherein the virtual screen includes details included in the schedule information.

17. The information processing device according to claim 16, wherein the details included in the schedule information are details for use in determining a person on the basis of the schedule information and/or details for use in determining a use item to be used by the user.

18. The information processing device according to claim 16, wherein the virtual screen is changed after an elapse of a predetermined period on the basis of the schedule information.

19. An information processing system comprising:
a management apparatus that manages schedule information that is information regarding a schedule of a user; and
an information processing device including:
a display that displays a virtual screen overlaid on a real space;
an image capturer that captures an image of the real space; and
a processor,
the information processing device displaying the virtual screen on the basis of the schedule information managed by the management apparatus, wherein:
the processor of the information processing device is configured to:
acquire the captured image of the real space from the image capturer;
acquire the schedule information from the management apparatus;
determine, on the basis of the schedule information, an addition target that is a target to which the virtual screen is to be added in the image of the real space captured by the image capturer, wherein
the schedule information comprises identification information for identifying the addition target among candidate addition targets, and
determine, on the basis of the schedule information, from the captured image of the real space, the addition target comprising:
perform an image recognition of the captured image of the real space so as to identify the addition target based on the identification information; and
perform control for causing the display to display the virtual screen in association with the addition target, wherein the virtual screen displays information for identifying the addition target among candidate addition targets.

20. A non-transitory computer readable medium storing a program causing a computer to execute a process comprising:
acquiring a captured image of a real space;
acquiring schedule information that is information regarding a schedule of a user;

determining, on the basis of the schedule information, from the captured image of the real space, an addition target that is a target to which a virtual screen is to be added, wherein
  the schedule information comprises identification information for identifying the addition target among candidate addition targets, and
  determining, on the basis of the schedule information, from the captured image of the real space, the addition target comprising:
    performing an image recognition of the captured image of the real space so as to identify the addition target based on the identification information; and
performing control for displaying the virtual screen in association with the addition target, wherein the virtual screen displays information for identifying the addition target among candidate addition targets.

\* \* \* \* \*